United States Patent [19]

Lew

[11] Patent Number: 5,060,523
[45] Date of Patent: Oct. 29, 1991

[54] VIBRATING LOOPED CONDUIT MASS FLOWMETER

[76] Inventor: Hyok S. Lew, 7890 Oak St., Arvada, Colo. 80005

[21] Appl. No.: 467,481

[22] Filed: Jan. 19, 1990

[51] Int. Cl.$^5$ .............................................. G01F 1/84
[52] U.S. Cl. .................................................. 73/861.38
[58] Field of Search ............................... 73/861.37–38

[56] References Cited

U.S. PATENT DOCUMENTS 4,934,195  6/1990  Hussain ............................ 73/861.38

Primary Examiner—Herbert Goldstein

[57] ABSTRACT

A mass flowmeter comprises a conduit with two extremities secured to a rigid support, wherein two sections of the conduit respectively extending from the two secured extremities of the conduit are connected to one another by a curved midsection, that is vibrated in direction generally parallel to the plane including the curved midsection by an electromagnetic vibrator at a natural frequency, wherein the mass flow rate of media moving through the conduit is determined from the phase angle difference in the flexural vibration of the conduit between the two halves of the conduit, which information is provided by a pair of motion sensors respectively measuring the flexural vibrations of the two opposite halves of the conduit.

13 Claims, 2 Drawing Sheets

VIBRATING LOOPED CONDUIT MASS FLOWMETER

BACKGROUND OF THE INVENTION

The mass flowmeters belonging to a category commonly known as Cariolis force flowmeter or the convective inertia force flowmeter determine the mass flow rate of media moving through a vibrating conduit by measuring the fluid dynamic reaction (convective inertia force) of the moving fluid to the flexural vibration of the conduit. It is well known fact that the magnitude of the fluid dynamic reaction of the moving fluid to the flexural vibration of the conduit is proportional to the mass flow rate times the gradient of the amplitude of the flexural vibration in the lengthwise direction of the conduit. In order to acquire a good sensitivity with the vibrating conduit mass flowmeter, the flexural vibration of the conduit employed in the mass flowmeter must experience a significant change in the curvature of the conduit during vibration. In other words, a straight conduit employed in the mass flowmeter must bend significantly back and forth during the vibration, and a curved tube must produce a new curvature during the vibration. The present day vibrating conduit mass flowmeters employing a straight vibrating conduit suffer badly from poor sensitivity with few exceptions. Without any exception, the curved conduits employed in the existing vibrating mass flowmeters are vibrated in directions perpendicular to the plane of curvature. As a consequence, none of the existing vibrating conduit mass flowmeters utilizes the advantage provided by the high gradient of the flexural vibration of the fluid moving through a looped conduit resulting from a flexural vibration of the conduit in directions parallel to a plane including the looped conduit.

BRIEF SUMMARY OF THE INVENTION

The primary object of the present invention is to provide a vibrating conduit mass flowmeter employing a looped conduit that is vibrated in direction parallel to a plane including the looped section of the conduit.

Another object is to provide a vibrating conduit mass flowmeter including a conduit having a 350 degree loop intermediate the two fixed extremities thereof, wherein a vibratory force exerted to the midsection of the looped conduit generates a flexural vibration of the conduit on a plane including the 350 degree loop, and the mass flow rate is determined from the difference in the flexural vibration between the two halves of the conduit.

A further object is to provide a vibrating looped conduit mass flowmeter employing a conduit having a Ω-shaped midsection intermediate two end sections of conduit respectively extending from the two fixed extremities of the conduit towards one another, wherein the conduit is vibrated on a plane generally including the Ω-shaped midsection.

Yet another object is to provide a vibrating conduit mass flowmeter including a pair of conduits, each of which conduits respectively includes a 360 degree loop intermediate the two fixed extremities thereof, which are disposed on a common plane in a mirror image to one another, wherein the two conduits are vibrated relative to one another in directions parallel to the common plane, and the mass flow rate is determined from the difference in the relative flexural vibrations between the first halves and between the second halves of the combination of the two conduits.

Yet a further object is to provide a vibrating conduit mass flowmeter including a conduit having a 540 degree loop intermediate the two fixed extremities thereof, wherein the conduit is vibrated in directions parallel to a plane including the 540 degree loop, and the mass flow rate is determined from the difference in the flexural vibration between the two halves of the conduit.

Still another object is to provide a vibrating conduit flowmeter employing two conduits respectively including a 540 degree loop, which are disposed on a common plane in a mirror ;image to one another, wherein the two conduits are vibrated relative to one another in directions parallel to the common plane, and the mass flow rate is determined from the difference in the relative flexural vibrations between the first halves and between the second halves of the combination of the two conduit.

Still a further object is to provide a vibrating conduit mass flowmeter employing a single conduit with a looped midsection, wherein diametrically sections in the looped midsection are vibrated relative to one another, the mass flow rate is determined from the difference in the flexural vibrations between the two halves of the conduit.

Yet still another object is to provide a vibrating conduit mass flowmeter employing a single conduit with two sections respectively adjacent to the two fixed extremities are disposed parallel to one another and a connected to one another by a looped midsection, wherein the two halves of the conduit are relative to one another in directions parallel to a common plane including the two end sections of the conduit, and the mass flow rate is determined from the difference in the flexural vibrations between the two halves of the conduit.

These and other objects of the present invention will become clear as description there of progresses.

BRIEF DESCRIPTION OF THE FIGURES

The present invention may be described with a greater clarity and specificity by referring to the following figures.

DESCRIPTION OF THE ILLUSTRATED EMBODIMENTS

Figure 1:
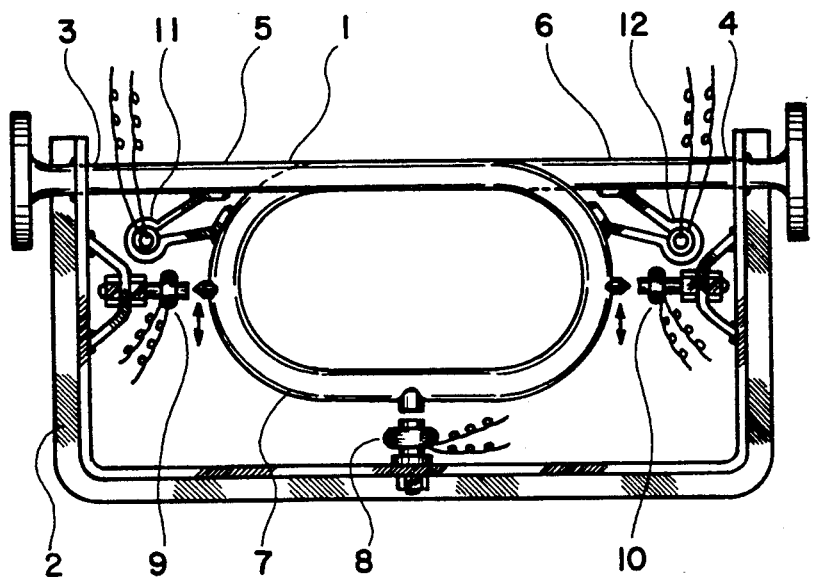
FIG. 1 illustrates an embodiment of the vibrating looped conduit mass flowmeter employing a single looped conduit.
Figure 7:
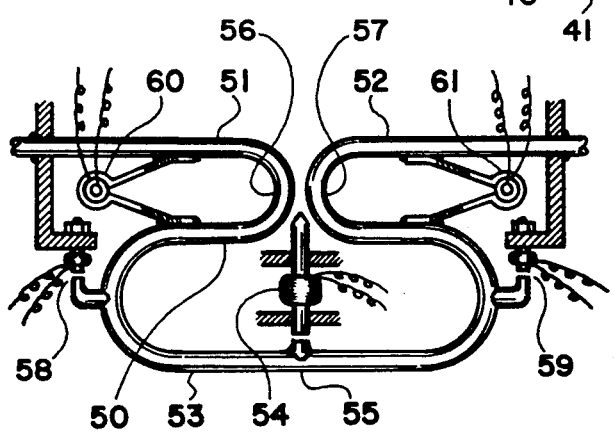
FIG. 7 illustrates yet another embodiment of the vibrating looped conduit mass flowmeter.

In FIG. 1 there is illustrated an embodiment of the vibrating looped conduit mass flowmeter employing a single conduit 1 secured to a rigid support 2 at the two extremities 3 and 4. The two end sections 5 and 6 of the conduit 1 respectively extending from the two fixed extremities 3 and 4 of the conduit 1 are disposed on two parallel planes off-set from one another and extend towards one another wherein the two end sections 5 and 6 are connected to one another by a looped midsection 7 with 360 degree loop angle. An electromagnetic vibrator 8 exerts a vibratory force to the midsection of the conduit, that produces a flexural vibration of the conduit 1 in directions generally parallel to a plane including the looped midsection 7 of the conduit 1. It is generally preferred to vibrate the conduit at the natural frequency thereof. A pair of motion detectors 9 and 10 respectively measure the flexural vibration of the conduit 1 at two sections thereof respectively belonging to the two halves of the conduit 1. As an alternative embodiment, a pair of motion sensors 11 and 12 may be employed, each of which measures the relative flexural vibration between one of the two opposite halves of the looped midsection 7 and one of the two end sections 5 and 6, wherein the pair of motion detectors are disposed symmetric about a plane passing through the midsection of the conduit 1. While the particular embodiment of the looped conduit shown in FIG. 1 is the most preferred embodiment, it may be readily modified as a variation in design, wherein the two generally straight end sections 5 and 6 may be angled up to plus or minus 45 degrees on the plane generally including the looped midsection 7 from the in-line arrangement shown in FIG. 1, wherein the two end sections 5 and 6 are now connected to one another by the looped midsection 7 that has a loop angle greater than 270 degree and less than 450 degrees. It should be understood that the looped midsection of loop angle greater than 270 degrees and less than 450 degrees may also be replaced by an $\Omega$-shaped midsection connecting the two end sections 5 and 6 to one another as shown in FIG. 7.

Figure 2:
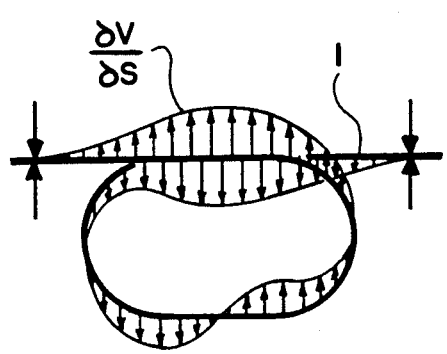
FIG 2 illustrates a distribution of the fluid dynamic reaction force to the vibrating looped conduit included in the embodiment shown in FIG. 1.

In FIG. 2 there is illustrated the distribution of the fluid dynamic reaction force of the fluid moving through the conduit 1 to the flexural vibration of the conduit 1 shown in FIG. 1. The electromagnetic vibrator 8 produces a flexural vibration of the conduit 1 that is symmetric about the plane dividing the conduit 1 into the two symmetric halves. The fluid dynamic reaction force is equal to $$A\rho U \frac{\partial v}{\partial S}$$

where A is the internal cross section area of the conduit 1, $\rho$ is the density of the fluid,    is the axial component of the fluid velocity parallel to the central axis of the conduit 1, $v$ is the normal component of the fluid velocity perpendicular to   , that is generated by the flexural vibration of the conduit 1, and $$\frac{\partial}{\partial S}$$

is a gradient derivative in a direction parallel to the central axis of the conduit 1. Since distribution of $v$ is symmetric about the midsection of the conduit 1, that of $$\frac{\partial v}{\partial S}$$

is antisymmetric about the midsection of the conduit 1. In other words, the forced flexural vibration of the conduit 1 induced by the electromagnetic vibrator 8 is symmetric about the midsection thereof when there is no flow therethrough. A moving media through the conduit 1 induces a secondary flexural vibration of the conduit 1 with amplitude proportional to $$A\rho U \frac{\partial v}{\partial S}$$

that is antisymmetric about the midsection of the conduit 1. Therefore, the mass flow rate of media moving through the conduit 1 can be determined by measuring the antisymmetric component of the flexural vibration of the conduit 1 about the midsection thereof. One of the more reliable method for measuring the antisymmetric component of the flexural vibration of the conduit 1 is to measure the phase angle difference in the flexural vibration of the conduit 1 between the two opposite halves of the conduit 1. As a consequence, the mass flow rate of media moving through conduit 1 can be determined from the phase angle difference between two vibratory motions respectively measured by the pair of motion sensors 9 and 10, or 11 and 12 shown in FIG. 1.

Figure 3:
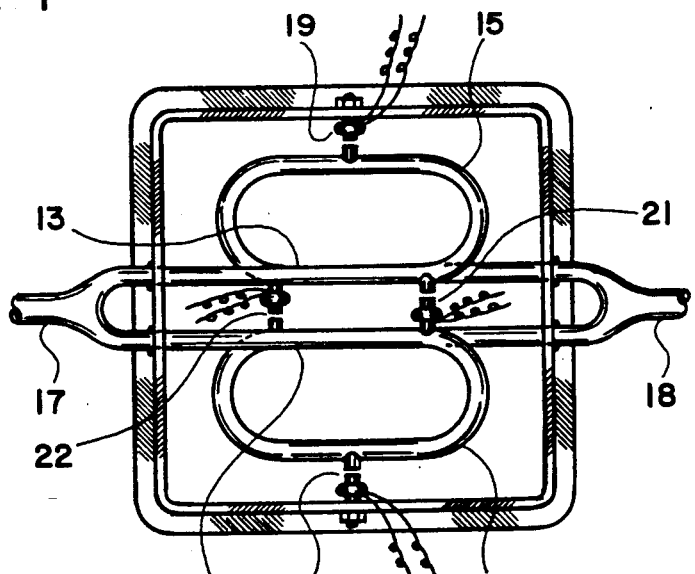
FIG. 3 illustrates an embodiment of the vibrating looped conduit mass flowmeter employing a pair of looped conduit.

In FIG. 3 there is illustrated an embodiment of the vibrating looped conduit mass flowmeter employing a pair of conduits 13 and 14, each of which has the same configuration as that of the conduit 1 shown in FIG. 1, wherein the end sections of the two conduits 13 and 14 are disposed parallel to one in a side by side arrangement and the looped midsections 15 and 16 are on a common plane in a symmetric arrangement about a plane perpendicular to the common plane and intermediate the two conduits 13 and 14, which have a common inlet 17 and outlet 18. The two conduits 13 and 14 are vibrated relative to one another by the pair of electromagnetic vibrators 19 and 20 on the common plane including the two looped midsections 15 and 16. The relative flexural vibration between the first halves of the two conduits 13 and 14 and that between the second halves are respectively measured by the pair of relative motion detectors 21 and 22. The mass flow rate is determined from the difference between the two relative vibrations such as the phase angle difference in the vibration respectively measured by the pair of relative motion detectors 21 and 22.

Figure 4:
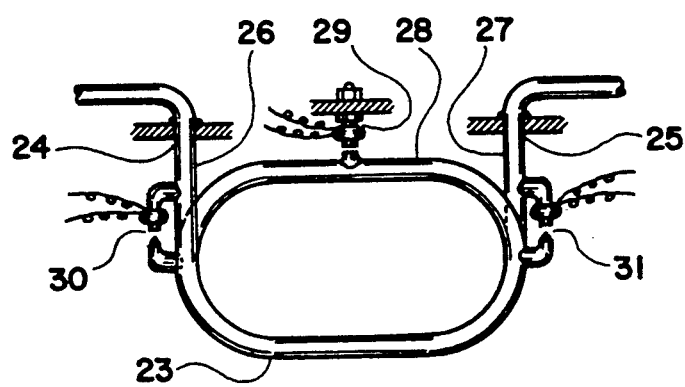
FIG. 4 illustrates another embodiment of the vibrating looped conduit mass flowmeter employing a single looped conduit.

In FIG. 4 there is illustrated another embodiment of the vibrating looped conduit mass flowmeter employing a single conduit 23 secured at the two extremities 24 and 25 thereof. The two end sections 26 and 27 respectively disposed on two parallel planes off-set from one another and extending from the respectively secured extremities in an over-hanging and parallel arrangement are connected to one another by a looped midsection 28 of a loop angle generally equal to 540 degrees. The looped midsection 28 is vibrated in directions to the plane including the looped midsection 28 by an electromagnetic vibrator 29 exerting a vibratory force to the midsection of the conduit 26. A pair of motion detectors 30 and 31 respectively measure the flexural vibrations of the two opposite halves of the looped midsection 28 of the conduit 23. The mass flow rate is determined from the difference in the flexural vibrations between the two halves of the looped midsection 28. While the configuration of the vibrating looped conduit 23 shown in FIG. 4 is one of the most desirable one, it may be modified by angling the two end sections 26 and 27 towards one another by an angle as large as 45 degrees or away from one another by an angle as large as 45 degrees. In such an alternative configuration, the looped midsection connecting the two end sections of the conduit 23 has a loop angle greater than 450 degrees and less than 630 degrees.

Figure 5:
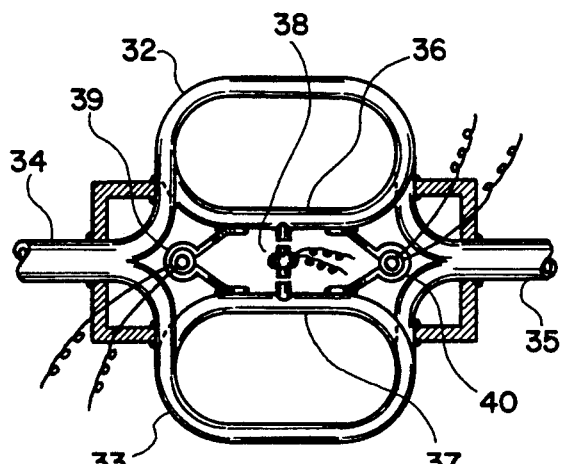
FIG. 5 illustrates another embodiment of the vibrating looped conduit mass flowmeter employing a pair of looped conduit.

In FIG. 5 there is illustrated another embodiment of the vibrating looped conduit mass flowmeter employing a pair of conduits having a common inlet 34 and outlet 35, each of which two conduits has the same configuration as the conduit 23 shown in FIG. 4. The two looped midsections 36 and 37 respectively belonging to the two conduits 32 and 33 are disposed on a generally common plane in a symmetric arrangement about a plane therebetween and perpendicular thereto, wherein the midsections of the two conduits are disposed in a parallel and side-by-side arrangement. The electromagnetic vibrator 38 vibrates the two looped midsections 36 and 37 relative to one another on a plane including the two looped midsections 36 and 37. A pair of relative motion sensors 39 and 40 respectively measure the relative flexural vibrations between the two looped 36 and 37 at two locations symmetrically positioned about the midsection of the combination of the two conduits 32 and 33. The mass flow rate is determined from the difference in the relative flexural vibration respectively measured by the two relative motion sensors 39 and 40.

Figure 6:
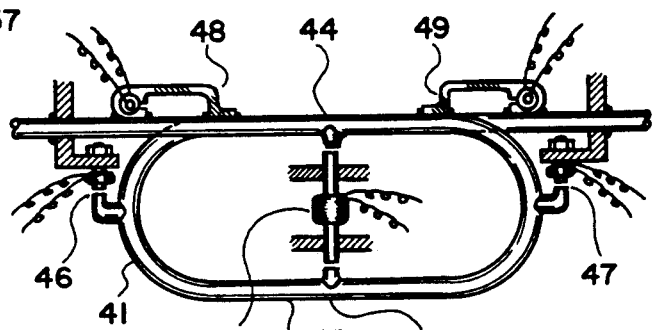
FIG. 6 illustrates a further embodiment of the vibrating looped conduit mass flowmeter.

In FIG. 6 there is illustrated a further embodiment of the vibrating looped conduit mass flowmeter employing a single conduit 41 having the same configuration as the conduit 1 shown in FIG. 1. In this embodiment, the electromagnetic vibrator 42 vibrates two diametrically opposite sections, i.e., the midsection 43 of the looped section including a single section of the conduit and the diametrically opposite portion 44 including the two parallel sections of the end sections of the conduit, relative to one another. The flexural vibrations of the two opposite halves of the conduit 41 are respectively measured by the pair of motion sensors 46 47, or by the pair of relative motion sensors 48 and 49. It can be readily realized that the looped conduit 23 shown in FIG. 4 can be vibrated in the same manner as that shown in FIG. 6.

In FIG. 7 there is illustrated yet another embodiment of the vibrating looped conduit mass flowmeter employing a single conduit with the two fixed extremities, wherein the two end sections 51 and 52 respectively extending from the two fixed extremities towards one another are connected to one another by a Ω-shaped midsection 53. An electromagnet 54 vibrates the midsection 55 of the conduit 53 and the combination of the two curved extremities 56 and 57 of the two end sections 51 and 52 relative to one another. The flexural vibrations of the two opposite halves of the Ω-shaped midsection 53 are respectively measured by the pair of motion sensors 58 and 59, or by the pair of relative motion sensors 60 and 61. It should be understood that the vibrating looped conduit 50 shown in FIG. 7 can be vibrated by an electromagnet fixed to a rigid support such as the element 8 shown in FIG. 1, which vibrates the midsection 55 in directions parallel to the plane including the Ω-shaped midsection 53 of the conduit 50.

It can be readily realized that a pair of conduits having the configuration shown in FIG. 7 can be employed to construct the type of vibrating looped conduit mass flowmeter shown in FIG. 3 or 5.

Figure 8:
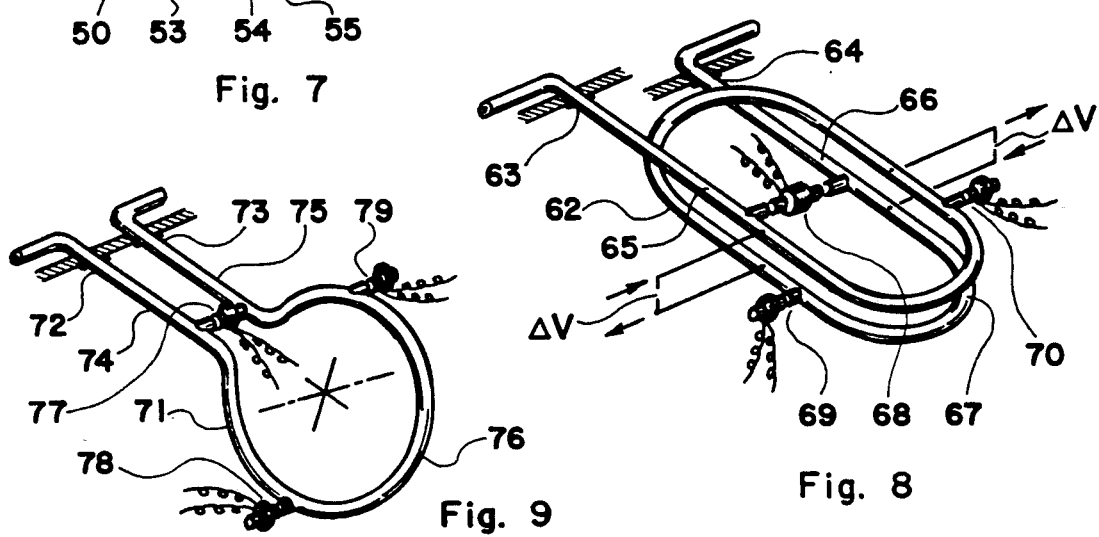
FIG. 8 illustrates yet a further embodiment of the vibrating looped conduit mass flowmeter.

In FIG. 8 there is illustrated yet a further embodiment of the vibrating looped conduit mass flowmeter comprising a single conduit with the two fixed extremities 63 and 64. The two generally straight end sections 65 and 66 respectively extending from the two fixed extremities 63 and 64 in a generally common direction is connected to one another by a looped midsection 67 of a loop angle generally equal to 540 degrees. The two generally straight end sections 65 and 66 of the conduit 62 are vibrated relative to one another by an electromagnetic vibrator 68. The flexural vibrations of the two opposite halves of the conduit 62 are respectively measured by the pair of motion sensors 69 and 70 or by a pair of relative motion sensors, each of which measures the relative vibration $\Delta v$ between one of the two end sections 65 and 66 and one of the two opposite halves of the looped midsection 67. The mass flow rate is determined from the phase angle difference between the flexural vibrations of the two opposite halves of the conduit 62. While the particular configuration of the conduit 62 shown in FIG. 8 is one of the most desirable design, the generally straight two end sections 65 and 66 may be angled towards one another or away from one another by an angle as large as 45 degrees. Therefore, the designs can be varied wherein the two end sections of the conduit is connected to one another by a looped midsection with a loop angle greater than 450 degrees and less than 630 degrees.

Figure 9:
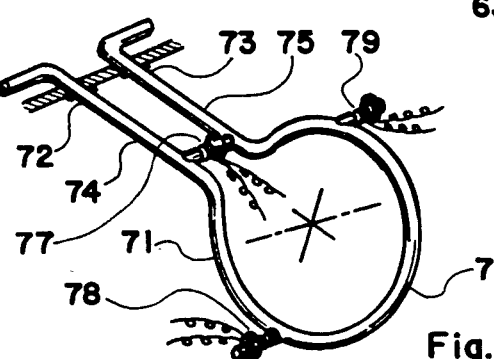
FIG. 9 illustrates still another embodiment of the vibrating looped conduit mass flowmeter.

In FIG. 9 there is illustrated still another embodiment of the vibrating looped conduit mass flowmeter comprising a single conduit 71 with two fixed extremities 72 and 73. The two generally straight end sections 74 and 75 respectively extending from the two fixed extremities 72 and 73 thereof in a generally parallel arrangement are connected to one another by a curved midsection 76 that is mostly disposed on a plane perpendicular to another plane including the two end sections 74 and 75. An electromagnetic vibrator 77 vibrates the two parallel end sections 74 and 75 relative to one another. A pair of motion sensors 77 and 79 respectively measure the flexural vibrations of the two opposite halves of the conduit 71. The mass flow rate is determined from the difference in the flexural vibration between the two opposite halves of the conduit 71. In closing the description of the illustrated embodiments, it should be mentioned that many different types of motion sensors available in todays motion sensing technology such as resistive, capacitive and inductive motion sensors may be used in measuring the flexural vibrations of the vibrating looped conduit in place of the particular types of the motion sensors such as the magnetic induction or Piezo electric motion sensors shown in the illustrative embodiments.

While the principles of the present inventions have now been made clear by the illustrative embodiments, there will be many modifications of the structures, arrangements, proportions, elements and materials obvious to those skilled in the art, which are particularly adapted to the specific working environments and operating conditions in the practice of the invention without departing from those principles. It is not desired to limit the inventions to the particular illustrative embodiments shown and described and, accordingly all suitable modifications and equivalents may be regarded as falling within the scope of the inventions as defined by the claims which follow.

The embodiments of the invention in which an exclusive property or privilege is claimed, are defined as follows:

1. An apparatus for measuring flow rate of media comprising in combination:
   a) a conduit with two extremities secured to a rigid support, said conduit including a first and second sections respectively extending from the two secured extremities of the conduit towards one another and connected to one another by a looped midsection of the conduit with a loop angle generally equal to 350 degrees;
   b) means for exerting a vibratory force to a midsection of the conduit in directions generally perpendicular to the midsection of the conduit and generally parallel to a plane substantially parallel to the looped midsection of the conduit, wherein the vibratory force induces a flexural vibration of the conduit in directions generally parallel to said plane; and
   c) a first motion sensor measuring relative flexural vibration between the first section of the conduit and a first half of the looped midsection connected to the second section of the conduit, and a second motion sensor measuring relative flexural vibration between the second section of the conduit and a second half of the looped midsection connected to the first section of the conduit;

wherein mass flow rate of media moving through the conduit is determined from difference between the two relative flexural vibrations respectively measured by the first and second motion sensors.

2. An apparatus for measuring flow rate of media comprising in combination:
   a) a first conduit with two extremities secured to a rigid support, said conduit including a first and second sections respectively extending from the two secured extremities of the conduit towards one another and connected to one another by a looped midsection of the conduit with a loop angle generally equal to 360 degrees;
   b) a second conduit disposed symmetrically to the first conduit about a plane of symmetry generally perpendicular to a plane substantially parallel to the two looped midsections respectively belonging to the first and second conduits, said first and second conduits connecting a common inlet to a common outlet in parallel connection;
   c) means for exerting a vibratory force to midsections of the first and second conduits in directions generally perpendicular to said plane of symmetry, wherein said vibratory force induces a relative flexural vibration between the first and second conduits in directions generally perpendicular to said plane of symmetry; and
   d) a first motion sensor measuring relative flexural vibration between first halves of the first and second conduits, and a second motion sensor measuring relative flexural vibration between second halves of the first and second conduits;

wherein mass flow rate of media moving through the first and second conduits is determined from difference between the two relative flexural vibrations respectively measured by the first and second motion sensors.

3. A combination as set forth in claim 1 wherein said means for exerting vibratory force induces a relative flexural vibration between a midsection of the looped midsection of the conduit and a combination of the first and second sections of the conduit in directions generally parallel to said plane, wherein said midsection and said combination of the first and second sections of the conduit vibrate in 180 degree out of phase from one another.

4. An apparatus for measuring flow rate of media comprising in combination:
   a) a conduit with two extremities secured to a rigid support, said conduit including a first and second sections respectively extending from the two secured extremities of the conduit towards a generally common direction and connected to one another by a looped midsection of the conduit with a loop angle generally equal to 540 degrees;
   b) means for exerting a vibratory force to a midsection of the conduit in directions generally perpendicular to the midsection of the conduit and generally parallel to a plane substantially parallel to the looped midsection of the conduit, wherein said vibratory force induces a flexural vibration of the conduit in directions generally parallel to said plane; and
   c) means for measuring the flexural vibration of the conduit at a first section belonging to a first half of the conduit and for measuring the flexural vibration of the conduit at a second section belonging to a second half of the conduit opposite to said first half;

wherein mass flow rate of media moving through the conduit is determined from difference between the two flexural vibrations respectively measured at said first and second sections.

5. A combination as set forth in claim 4 wherein said means for measuring the flexural vibration comprises a pair of motion sensors respectively measuring the flexural vibration of the conduit at two sections respectively belonging to the two opposite halves of the looped midsection.

6. A combination as set forth in claim 4 wherein said means for measuring the flexural vibration comprises a first motion sensor measuring relative flexural vibration between the first section of the conduit and a first half of the looped midsection connected to the second section of the conduit, and a second motion sensor measuring relative flexural vibration between the second section of the conduit and a second half of the looped midsection connected to the first section of the conduit.

7. A combination as set forth in claim 4 wherein said combination includes another conduit disposed symmetrically to said a conduit about a plane of symmetry generally perpendicular to a plane substantially parallel to the two looped midsections respectively belonging to said a and another conduits, said a and another conduits connecting a common inlet to a common outlet in parallel connection, wherein said means for exerting vibratory force induces a relative flexural vibration between said a and another conduits in directions generally perpendicular to said plane of symmetry, and said means for measuring the flexural vibration comprises a first motion sensor measuring relative flexural vibration between first halves of said a and another conduits and a second motion sensor measuring relative flexural vibration between second halves of said a and another conduits.

8. A combination as set forth in claim 4 wherein said means for exerting vibratory force induces a relative flexural vibration between a midsection of the looped midsection of the conduit and a combination of two other sections of the looped midsection of the conduit located diametrically opposite to said midsection of the looped midsection in directions generally parallel to said plane.

9. An apparatus for measuring flow rate of media comprising in combination:
   a) a conduit with two extremities secured to a rigid support, said conduit including a first and second sections respectively extending from the two secured extremities of the conduit and connected to one another by a curved midsection of the conduit, said curved midsection including a first curved section turning media moving through the conduit in a first direction, a second curved section adjacent to the first curved section turning the media in a second direction opposite to said first direction, and a third curved section adjacent to the second curved section turning the media in said first direction;
   b) means for exerting a vibratory force to a midsection of the conduit in directions generally perpendicular to the midsection of the conduit and generally parallel to a plane substantially parallel to the second curved section of the curved midsection, wherein said vibratory force induces a flexural vibration of the conduit in directions generally parallel to said plane; and
   c) means for measuring the flexural vibration of the conduit at a first section belonging to a first half of the conduit and for measuring the flexural vibration of the conduit at a second section belonging to a second half of the conduit opposite to said first half;
wherein mass flow rate of media moving through the conduit is determined from difference between the two flexural vibrations respectively measured at said first and second sections.

10. A combination as set forth in claim 9 wherein said means for measuring the flexural vibration comprises a pair of motion sensors respectively measuring the flexural vibration of the conduit at two sections of the conduit respectively belonging to the two opposite halves of said second curved section included in the curved midsection of the conduit.

11. A combination as set forth in claim 9 wherein said means for measuring the flexural vibration comprises a first motion sensor measuring relative flexural vibration between the first section of the conduit and a first half of said second curved section adjacent to said first curved section, and a second motion sensor measuring relative flexural vibration between the second section of the conduit and a second half of said second curved section adjacent to said third curved section.

12. A combination as set forth in claim 9 wherein said combination includes another conduit disposed symmetrically to said a conduit about a plane of symmetry generally perpendicular to a plane substantially parallel to the two second curved sections respectively belonging to said a and another conduits, said a and another conduits connecting a common inlet to a common outlet in parallel connection, wherein said means for exerting vibratory force induces a relative flexural vibration between said a and another conduits in directions generally perpendicular to said plane of symmetry, and said means for measuring the flexural vibration of the conduit comprises a first motion sensor measuring relative flexural vibration between first halves of said a and another conduits, and a second motion sensor measuring relative flexural vibration between second halves of said a and another conduits.

13. A combination as set forth in claim 4 wherein said means for exerting vibratory force induces a relative flexural vibration between a midsection of said second curved section and a combination of said first and third curved sections in directions generally parallel to said plane.

* * * * *